United States Patent
Jung et al.

(10) Patent No.: US 7,538,678 B2
(45) Date of Patent: May 26, 2009

(54) DATA STORING APPARATUS AND METHOD FOR RFID TAGS WITH SENSORS

(75) Inventors: Jae-Young Jung, Daejon (KR); Jun-Ho Yeo, Daejon (KR); Hae-Won Son, Daejon (KR); Gil-Young Choi, Daejon (KR); Yoon-Mee Doh, Daejon (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 309 days.

(21) Appl. No.: 11/542,479

(22) Filed: Oct. 3, 2006

(65) Prior Publication Data

US 2007/0132588 A1    Jun. 14, 2007

(30) Foreign Application Priority Data

Dec. 9, 2005    (KR) .................... 10-2005-0121140

(51) Int. Cl.
  G08B 13/14    (2006.01)
(52) U.S. Cl. ............ 340/572.1; 340/539.1; 340/539.22; 340/825.69; 340/825.72; 340/10.3; 340/10.52; 340/5.8
(58) Field of Classification Search ............... 340/572.1, 340/572.4, 539.1, 539.22, 825.69, 825.72, 340/10.3, 10.52, 5.61, 5.8, 5.85; 235/487, 235/492
See application file for complete search history.

(56) References Cited

U.S. PATENT DOCUMENTS 7,267,275 B2 *   9/2007   Cox et al. .................... 235/451
7,408,799 B2 *   8/2008   Kang ......................... 365/145
2005/0148828 A1  7/2005   Lindsay
2006/0087407 A1 * 4/2006   Stewart et al. ........... 340/10.52
2007/0008070 A1 * 1/2007   Friedrich ................... 340/10.1
2008/0129447 A1 * 6/2008   Choi et al. ................. 340/5.61

FOREIGN PATENT DOCUMENTS

| JP | 2002-150252 A | 5/2002 |
| JP | 2005-011084 A | 1/2005 |
| JP | 2005-018175 A | 1/2005 |
| KR | 1020050099495 A | 10/2005 |

* cited by examiner

Primary Examiner—Hung T. Nguyen
(74) Attorney, Agent, or Firm—Ladas & Parry LLP

(57) ABSTRACT

Provided is a data storing apparatus and method for Radio Frequency Identification (RFID) tags with sensors. The apparatus includes: a first storing block which includes a kill password storage and an access password storage; a second storing block which includes an Electronic Product Code (EPC) storage, a protocol control storage, and an error check storage storing a Cyclic Redundancy Checking (CRC) code for detecting a transmission error; a third storing block which includes a tag identifier storage storing a tag identifier including a manufacture model and a serial number of the tag; and a fourth storing block which includes an initial sensor data storage storing initial information of the sensor, a real-time information storage, a maximum/minimum data storage storing maximum/minimum values, a sensor data storage storing sensing data actually measured through the sensor embedded in the RFID tag.

12 Claims, 8 Drawing Sheets

DATA STORING APPARATUS AND METHOD FOR RFID TAGS WITH SENSORS

FIELD OF THE INVENTION

The present invention relates to a data storing apparatus and method for Radio Frequency Identification (RFID) tags with sensors; and, more particularly, to an RFID tag data storing apparatus and method, which stores data acquired through a sensor embedded in the tag by a method specialized for an efficient data format and a user application model.

DESCRIPTION OF RELATED ART

In general, a Radio Frequency Identification (RFID) technology provides such services as object positioning, teleprocessing, management, and information exchange between objects by attaching a tag to an individual object, wirelessly recognizing the identification of the object, and collecting, storing, processing and tracking the information. The RFID technology substitutes a bar code system and it is applied to diverse fields such as materials management, distribution and security. Accordingly, it is expected that a new market will emerge through the technology.

Particularly, since recent RFID tags have own identification information and can also sense environment information, application areas of the RFID sensor tags are increasing.

In addition, massive memory storage is required to continuously sense and store a lot of peripheral information. However, since a conventional RFID tag apparatus including a sensor stores only limited information, the apparatus does not comply with the requirement.

SUMMARY OF THE INVENTION

It is, therefore, an object of the present invention to provide a data storing apparatus and method for Radio Frequency Identification (RFID) tags with sensors for efficiently managing all information desired by a user by saving space of a memory by processing data inputted through a sensor in real-time when the data are stored in an RFID tag and a memory of the tag.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a data storing apparatus for RFID tags with sensors, the apparatus including: a first storing block which includes a kill password storage storing a kill password that an RFID reader transmits to an RFID tag in order to halt operation of the RFID tag, and an access password storage storing an access password of the tag; a second storing block which includes an Electronic Product Code (EPC) storage storing a code for identifying an object having the tag, a protocol control storage having physical-layer information of the code storage, and an error check storage storing a Cyclic Redundancy Checking (CRC) code for detecting a transmission error; a third storing block which includes a tag identifier storage storing a tag identifier including a manufacture model and a serial number of the tag; and a fourth storing block which includes an initial sensor data storage storing initial information of the sensor, a real-time information storage storing information of year, month, day, time, minute and second, a maximum/minimum data storage storing maximum/minimum values compared to set up an excess/validity region of the sensing data, and a sensor data storage storing sensing data actually measured through the sensor embedded in the RFID tag.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
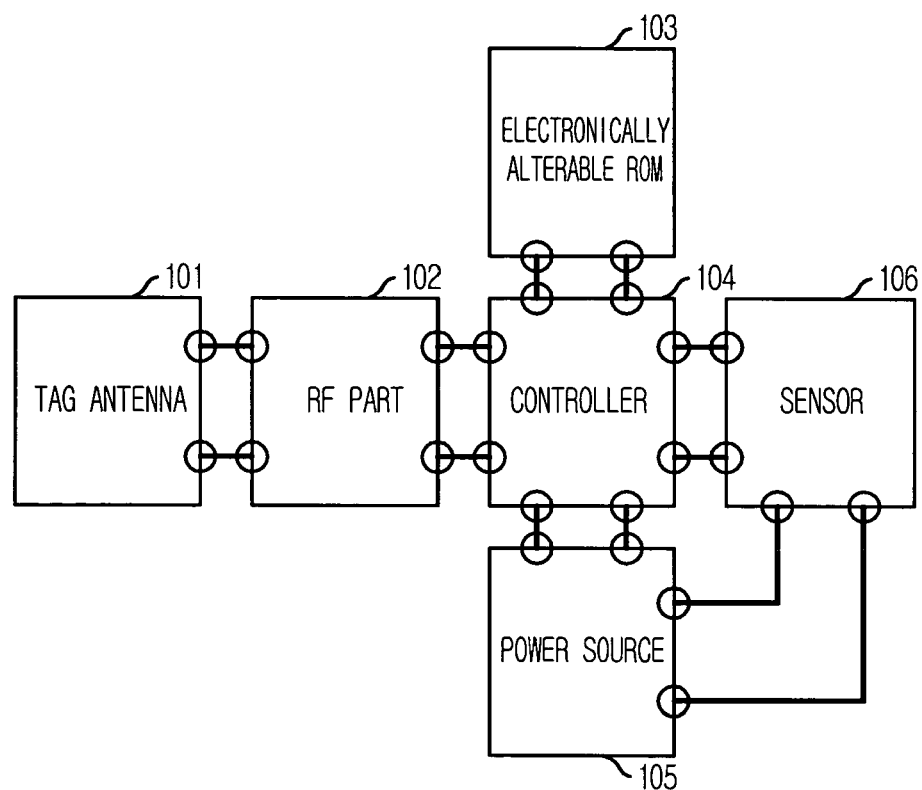
FIG. 1 is a block diagram showing a system to which a Radio Frequency Identification (RFID) tag data storing apparatus including a sensor of the present invention is applied.

FIG. 1 is a block diagram showing a system to which an RFID tag data storing apparatus including a sensor of the present invention is applied.

As shown in FIG. 1, the system, to which a Radio Frequency Identification (RFID) tag data storing apparatus of the present invention is applied, includes a tag antenna 101, a Radio Frequency (RF) part 102, an electronically erasable programmable Read Only Memory (ROM) 103, a controller 104, a power source 105 and a sensor 106.

The tag antenna 101 receives a continuous electromagnetic wave signal having a specific frequency and a modulated RF signal, which is a command of a reader, to the RF part 102, and transmits the data stored in the memory in the inside of the tag transmitted through the RF part 102.

The RF part 102 generates enough power required for transformation into tag operation state based on the continuous electromagnetic wave signal transmitted from the tag antenna 101, transmits the power to the controller 104 and the electronically erasable programmable ROM 103, performs a command of the reader by transmitting the modulated RF signal to the controller 104, modulates the data stored in the electronically erasable programmable ROM 103 to the tag antenna 101.

The electronically erasable programmable ROM 103 is a RFID tag memory and stores all information related to an identifier and a sensor of the tag.

The controller 104 analyzes/processes the command of the reader from the RF part 102, processes the data acquired from the sensor 106, stores the data in the electronically erasable programmable ROM 103 and transmits the data to the RF part 102.

The power source 105 for supplying power to the sensor 106 selectively provides the power to the electronically erasable programmable ROM 103 and the controller 104 when the RF part 102 does not provide power sufficiently.

The sensor 106 embedded in the tag senses and transmits peripheral environment information to the controller 104.

All operation controls of the sensor 106 includes a command of the controller 104 and a method for processing the acquired data is divided into transmitting the data through the controller 104 to the reader and storing the data in the electronically erasable programmable ROM 103.

The sensor embedded in the tag includes all kinds of sensors which can sense physical/chemical/biological information data, e.g., temperature, pressure, humidity, luminance, smoke, voltage, current and resistance.

Each role of the components of the system, to which the RFID tag data storing apparatus including a sensor and having the structure described above is applied, will be described in detail hereinafter in accordance with the present invention.

The tag antenna 101 generally uses a method that the electromagnetic wave transmitted from the reader is scattered by the tag and returned to the reader.

When the controller 104 and the electronically erasable programmable ROM 103 are not well operated, the RF part 102 is driven through the aid of the power source 105.

A method for transforming a size or a phase of the electromagnetic wave is generally used to modulate the data transmitted to the tag antenna 101.

The electronically erasable programmable ROM 103 will be described in detailed again in FIGS. 2A and 2B to be described hereinafter.

Since the controller 104 includes a device receiving information in real-time, the controller 104 stores the information in a real-time information storage 242, decodes/realizes all commands of the reader, which are generated in a communication process between the reader and the tag, and includes all additional commands of the reader, which are required for acquiring sensor data.

Figure 2A:
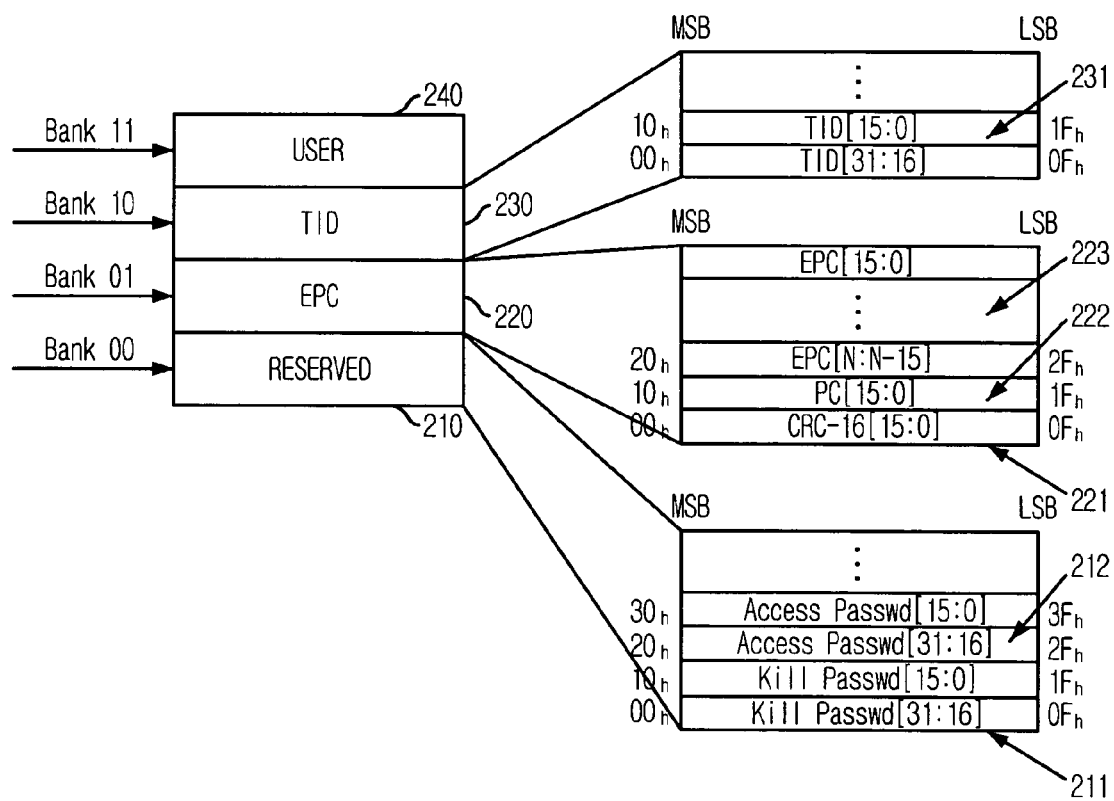
FIGS. 2A and 2B are diagrams showing the RFID tag data storing apparatuses including a sensor in accordance with an embodiment of the present invention.
Figure 2B:
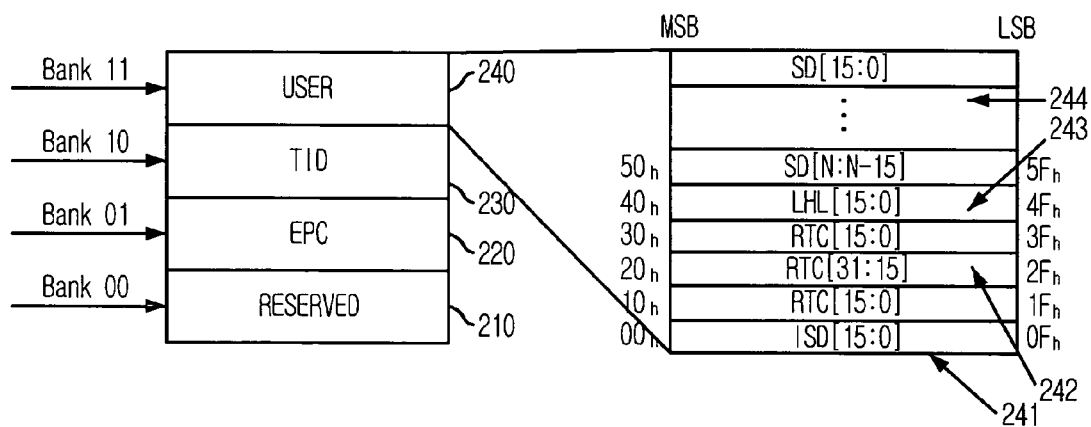

FIGS. 2A and 2B are diagrams showing an RFID tag data storing apparatus including a sensor in accordance with the embodiment of the present invention.

As shown in FIGS. 2A and 2B, the RFID tag data storing apparatus including the sensor of the present invention includes a reserved unit 210, an Electronic Products Code (EPC) unit 220, a tag identifier (TID) unit 230 and a user memory unit 240.

The reserved unit 210 includes a kill password storage storing a kill password which the RFID reader transmits to the RFID tag to stop the operation of the RFID tag, and an access password storage storing an access password of the RFID tag.

The EPC unit 220 includes a code storage storing a code for identifying an object, to which the RFID tag is attached, a protocol control storage including physical-layer information of the code storage and an error check storage storing a Cyclic Redundancy Checking (CRC) code for detecting a transmission error.

The TID unit 230 includes a tag identifier storage storing a tag identifier including a manufacture model and a serial number of the RFID tag.

The user memory unit 240 includes an initial sensor data storage storing initial information of the sensor, a real-time information storage storing year information, month information, day information, time information, minute information and second information, a maximum/minimum data storage storing maximum/minimum values, which are compared to set up an excess/validity region of the sensing data, and a sensor data storage storing sensing data actually measured through the sensor embedded in the RFID tag.

An operation of the RFID tag data storing apparatus including the sensor will be described in detail hereinafter in accordance with the present invention having the above-mentioned structure.

FIG. 2A shows an example that the RFID tag data storage to be described in the present invention is applied to "EPCglobal class1 Gen2 Protocol", which is established as a standard of a 900 MHZ band. In fact, the tag data storage of the present invention can be applied to all RFID tag systems having a memory.

As shown in FIG. 2A, the reserved unit 210 includes a kill password storage 211 and an access password storage 212.

Herein, the kill password storage 211 is formed of 32 bits and an initial value is set up as "0". When the reader sends a kill password to the tag, the tag stops all operations. The access password storage 212 is formed of 32 bits and an initial value is set up as "0". A tag having an access password except "0" requests the reader for a password before the tag is transformed into a secured state.

The EPC unit 220 includes an error check storage 221, a protocol control storage 222 and an EPC storage 223.

The error check storage 221 is formed of 16 bits and uses Cyclic-Redundancy Check (CRC-16), which cannot fix a transmission error, but is very reliable for detecting the transmission error. A backscatter process of bit information of the EPC storage 223 is performed to check an initial tag before the reader and the tag communicate with each other. Herein, the protocol control storage 222 includes physical-layer information of the EPC storage 223. The EPC storage 223 contains a code for identifying an object with the tag attached thereto.

The TID unit 230 includes a tag identifier storage containing a manufacture model and a serial number of the tag.

FIG. 2B is a diagram showing a tag data storage of the RFID tag data storing apparatus including the sensor in the present invention. The user memory unit 240 includes an initial sensor data storage 241, a real-time information storage 242, a maximum/minimum data storage 243 and a sensor data storage 244.

Herein, the initial sensor data storage 241 stores initial information of the sensor and includes a sensor type information storage 311, a tag type information storage 312 and a time interval information storage 313. It will be described in detail with reference to FIG. 3 hereinafter.

The real-time information storage 242 stores time information in the inside of the tag in real-time and there are diverse methods for storing the time information based on the forms of the tag and the reader such as a method for receiving a time information command of the reader and storing the time information through the controller 104 and a method for storing the time information through a device providing the real-time information in the inside of the tag.

Figure 3:
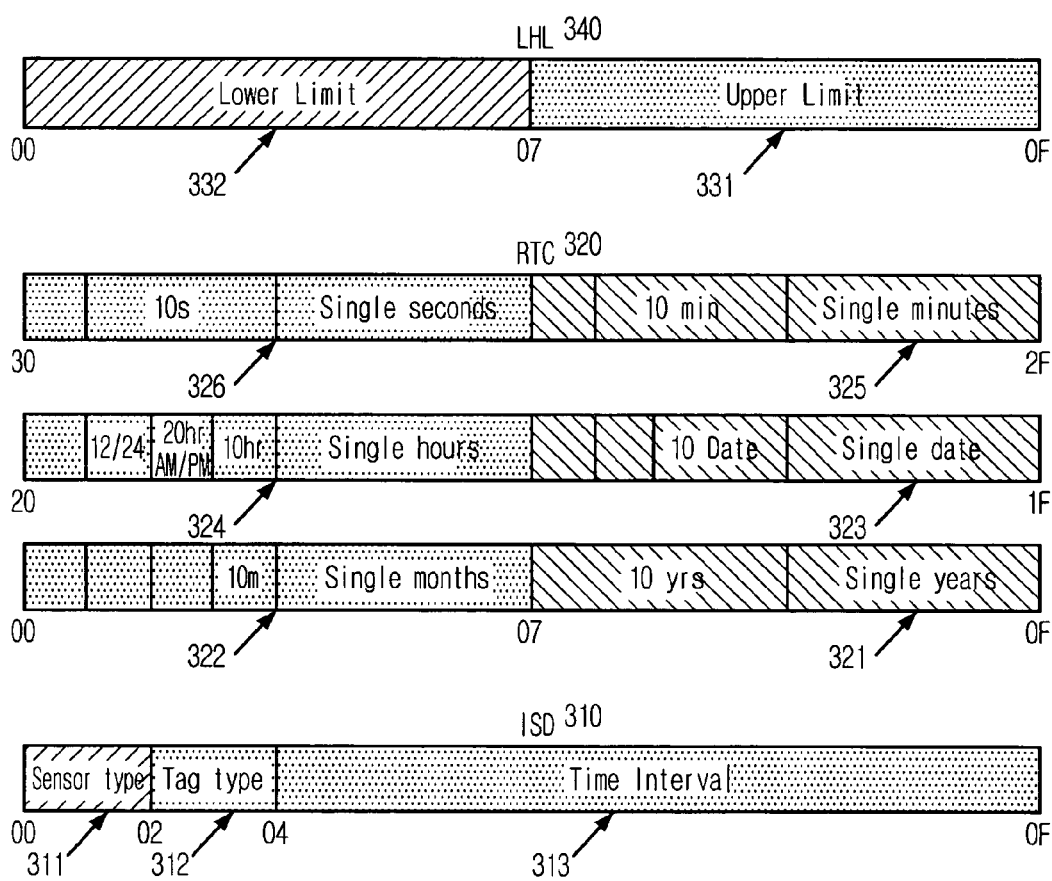
FIG. 3 is a diagram showing a user defined space in the inside of the tag data storage of the RFID tag data storing apparatus including a sensor in accordance with the embodiment of the present invention.

The real-time information storage 242 includes a year information storage 321, a month information storage 322, a day information storage 323, a time information storage 324, a minute information storage 325 and a second information storage 326 as shown in FIG. 3.

When a user considers an application limit of the RFID tag including a sensor in advance, the maximum/minimum data storage 243 can be used to store maximum/minimum values.

There are diverse methods for storing the maximum/minimum values based on the forms of the tag and the reader such as a method for receiving a command of the reader and storing the maximum/minimum values through the controller 104 and a method for pre-storing the information when the tag is manufactured.

The maximum/minimum data storage 243 includes a maximum information storage 331 and a minimum information storage 332. It will be mentioned again in FIGS. 4A to 4D to be described hereinafter.

The sensor data storage 244 stores actual measured data through the sensor embedded in the RFID tag, and there is no limitation in capacity of the storage.

As mentioned above, the RFID tag apparatus including a sensor of the present invention provides a method for efficiently managing all information desired by a user by sufficiently saving a space of the memory and it will be mentioned again with reference to FIGS. 4A to 4G to be described hereinafter.

FIG. 3 shows a structure of a user defined space in the inside of the RFID tag data storing apparatus including a sensor in accordance with the embodiment of the present invention.

As shown in FIG. 3, the initial sensor data storage 241 includes the sensor type information storage 311, the tag type information storage 312 and the time interval information storage 313.

Herein, the sensor type information storage 311 designates a type of the sensor embedded in the RFID tag and is expressed as 2 bit code.

In the present invention, one example of the sensor type information storage is as follows.

$00_2$ . . . no sensor
$01_2$ . . . temperature sensor
$10_2$ . . . humidity sensor
$11_2$ . . . pressure sensor The embedded sensor of the present invention includes all types of sensors, which are in charge of sensing physical/chemical/biological information data.

The reader communicating with the RFID tag with a sensor can determine whether to operate the chosen sensor by transmitting a command with reference to the data of the sensor type information storage 311. Also, the reader can acquire data from various sensors by selectively designating or by pre-designating time interval information when the tag is manufactured.

The type of the tag including the sensor is subdivided in the tag type information storage 312, which is expressed as a 2-bit code. In the present invention, one example of the tag type information storage 312 is as follows. When it is assumed that the RFID sensor tag is applied to a blood management application using a temperature sensor, the tag type information storage 312 can be subdivided into platelets, a red blood cell and blood plasma based on storing temperature.

$00_2$ . . . unsettled
$01_2$ . . . platelets
$10_2$ . . . red blood cell
$11_2$ . . . blood plasma The time interval information storage 313 designates a sensing time interval of the RFID sensor tag and is expressed as a 12-bit code. When 1 bit is designated as a sensing time of 1 second unit, the time which can be expressed as 12 bits is longer than 1 hour. The reader, which communicates with the RFID sensor tag, can sense data at a designated time interval by transmitting a time interval information command to the time interval information storage 313 or by pre-designating time interval information when the tag is manufactured.

The real-time information storage 242 includes the year information storage 321, the month information storage 322, the day information storage 323, the time information storage 324, the minute information storage 325 and the second information storage 326, and the time information is provided by a command of the reader or provided/stored by a real-time information storing and supplying device in the controller.

The year information storage 321 is formed of 8 bits and has a binary-coded decimal (BCD) code format. Herein, the BCD code is a method for expressing each number as a binary number. Upper 4 bits store year information on a basis of 10 years and lower 4 bits store the year information on a basis of 1 year.

The month information storage 322 is formed of 8 bits and has the BCD code format. Upper 1 bit stores month information on a basis of 10 months and lower 4 bits store the month information on a basis of 1 month.

The day information storage 323 is formed of 8 bits and has the BCD code format. Upper 2 bits store day information on a basis of 10 days and lower 4 bits store the day information on a basis of 1 day.

The time information storage 324 is formed of 8 bits and has the BCD code format. The $7^{th}$ bit shows 12 and 24 hours modes. The $6^{th}$ bit indicates AM/PM in case of the 12 hours mode in a former bit and is set up as a 20 hours bit in case of the 24 hours mode. Also, lower 4 bits store time information on a basis of 1 hour unit.

The minute information storage 325 is formed of 8 bits and has the BCD code format. Upper 3 bits store minute information of a 10 minutes unit and lower 4 bits store minute information of a 1 minute unit.

The second information storage 326 is formed of 8 bits and has the BCD code format. Upper 3 bits store second information of a 10 seconds unit and lower 4 bits store second information of a 1 second unit.

FIGS. 4A to 4G are exemplary diagrams showing various methods for storing data of the RFID sensor tag of the present invention. Following methods are determined by a command of the reader or a method pre-designated when the tag is manufactured.

Figure 4A:
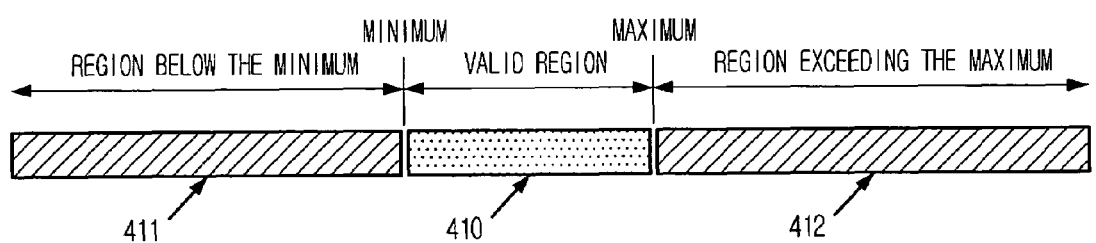
FIGS. 4A to 4G are exemplary diagrams describing a method for storing data of the RFID tag having a sensor.

In a method for storing the data acquired from the sensor embedded in the RFID tag in the electronically erasable programmable ROM 103, FIG. 4A shows a method for comparing/calculating sensing data inputted in real-time with maximum/minimum values of the maximum/minimum data storage 243 in the controller 104, and storing only maximum/minimum excess region values in the electronically erasable programmable ROM 103. Also, it is a method for storing a sensing value only in a validity region after the above comparison/calculation.

In this case, the sensing interval is based on a bit value of the time interval information storage 313. The stored data bit generally includes an upper sign bit and is formed of 8 bits.

An example of the sensing data stored as 8 bits is as follows.

| Temperature | 8-bit digital data |
|---|---|
| −10° C. | 1111 0110 |
| 0° C. | 0000 0000 |
| 10° C. | 0000 1010 |

Temperature data has a value of "0000 0000" at 0° C., which is 8-bit data, and has a change of 1 bit whenever the temperature increases 1° C. Upper 1 bit has a sign value. In case of a negative number, the upper 1 bit has a value taking a complement of 2 from a temperature value of a positive number.

Figure 4B:
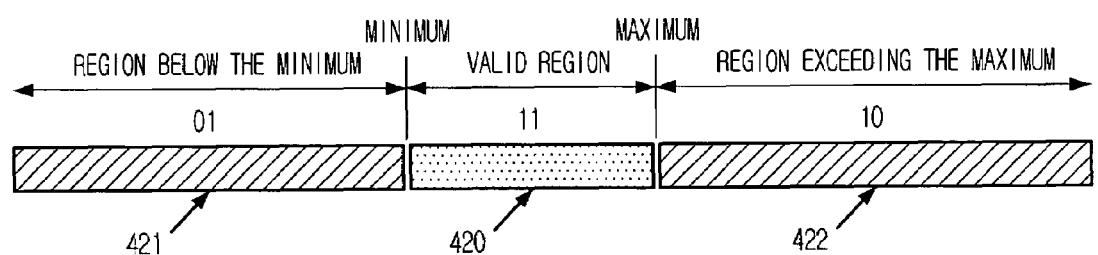

FIG. 4B shows a method for comparing/calculating data acquired from the sensor embedded in the RFID tag with maximum/minimum values of the maximum/minimum data storage 243 in the controller 104, and storing only maximum/minimum excess region values. The method of FIG. 4B is the same as that of FIG. 4A except that only a coded state value of 2 bits is stored with respect to the data corresponding to each region in the method of FIG. 4B.

| Bit | Data Region State |
|-----|-------------------|
| 00  | error             |
| 01  | region below the minimum |
| 10  | region exceeding the maximum |
| 11  | valid region      |

A capacity of the memory can be efficiently managed by a command of the reader or by designating a value pre-determined when the tag is manufactured, and storing only a corresponding value in the electronically erasable programmable ROM 103.

Herein, the sensing interval is based on a bit value of the time interval information storage 313 and a stored data bit is formed of 2 bits.

Figure 4C:
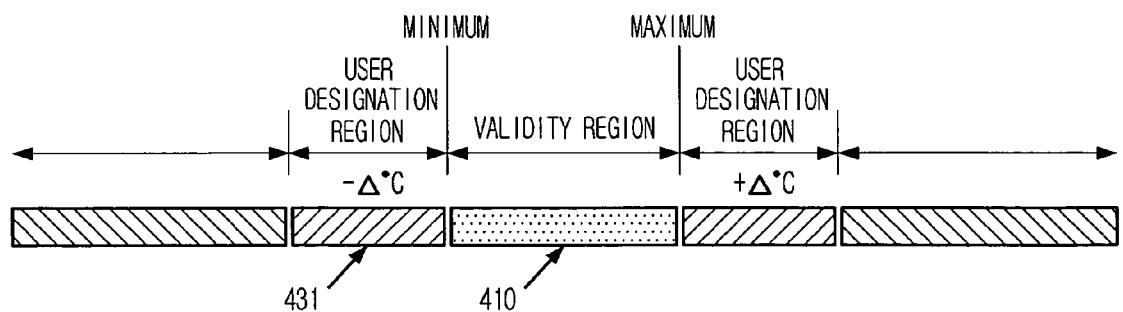

FIG. 4C shows a method for comparing/calculating data acquired from the sensor embedded in the RFID tag with the maximum/minimum values of the maximum/minimum data storage 243 in the controller 104, and storing only maximum/minimum excess region values. The method of FIG. 4C is the same as that of FIG. 4A except that a capacity of the memory can be efficiently managed by a command of the reader or by designating a value pre-determined when the tag is manufactured, and storing a corresponding value in the electronically erasable programmable ROM 103 in the method of FIG. 4C.

Herein, the sensing interval is based on a bit value of the time interval information storage 313 and a stored data bit is formed of 8 bits by including an upper sign bit.

Figure 4D:
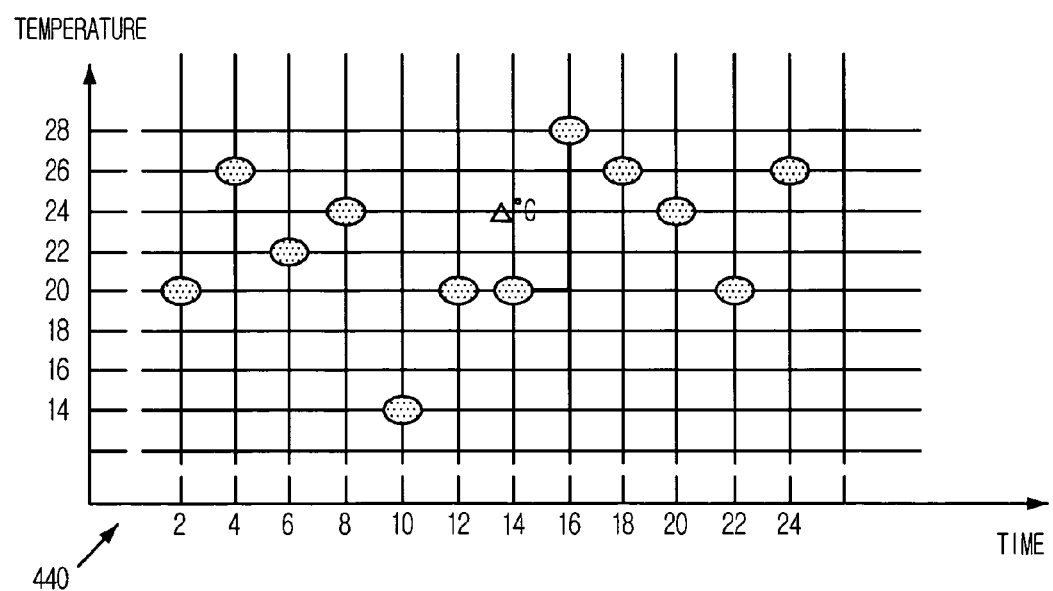

Referring to FIG. 4D, a capacity of the memory is efficiently managed by storing only a difference between two neighboring data inputted in real-time.

Figure 4E:
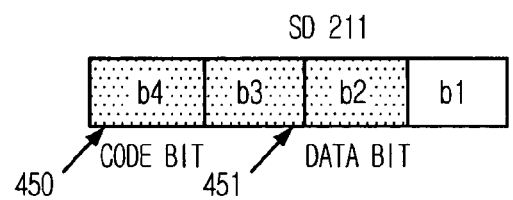

In this case, as shown in FIG. 4E, the data are stored on a basis of a 4-bit unit. The $4^{th}$ bit is a sign bit and shows a sign with respect to a difference between two neighboring data. Other 3 bits are bit values with respect to a difference.

Figure 4F:
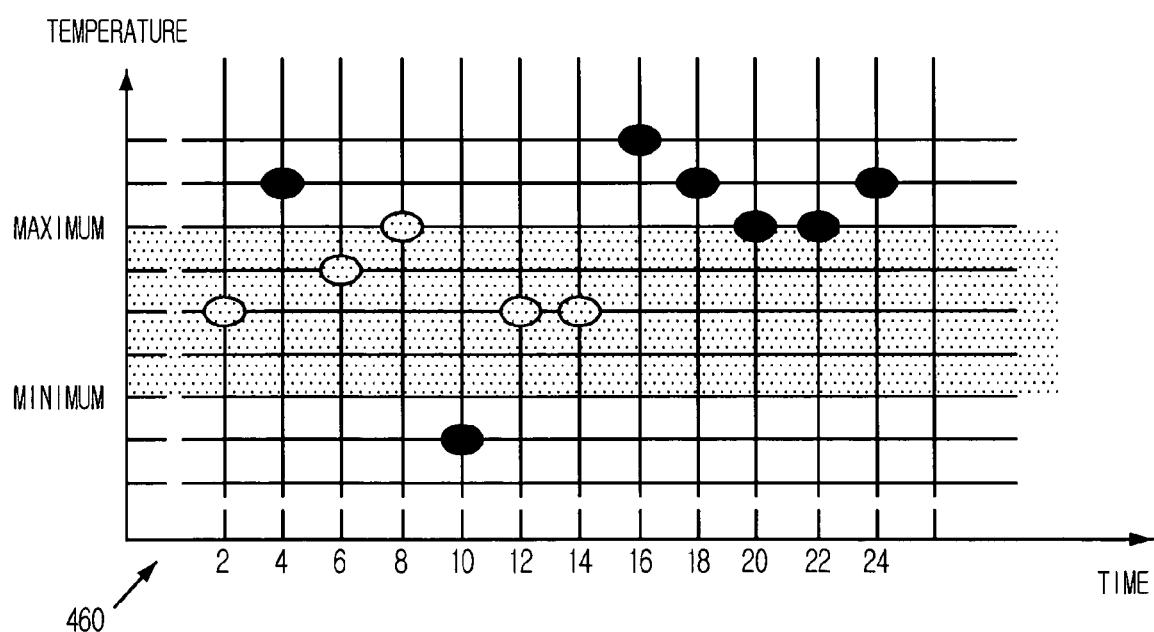
Figure 4G:
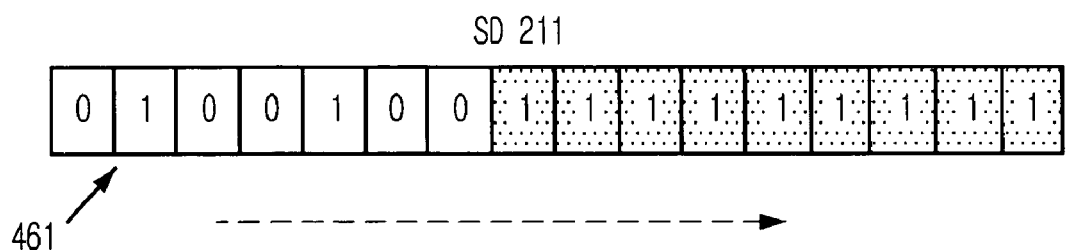

Referring to FIG. 4F, in the electronically erasable programmable ROM 103, when the sensing data inputted in real-time are compared with the maximum/minimum regions, a value "0" is stored in case of data in the inside of the valid region and a value "1" is stored in case of other data. One example of this case is shown in FIG. 4G.

Comparing the stored value and a data bit of the time interval information storage 313, data out of a specific interval are not stored any more in the above method.

One example of the present invention is as follows.

When red blood cells are exposed in a room temperature for longer than 30 minutes, the temperature of the red blood cells rises higher than 10° C., germs may proliferate, and the blood should be abandoned.

Accordingly, when the tag having the sensor for managing blood is applied, the red blood cells exposed in the room temperature for longer than 30 minutes should be abandoned. In this case, the sensor data can be stored by the method of FIG. 4F. That is, when it is checked in consideration of the number of "1", which is a bit value out of a validity range, and time interval information that the red blood cells are exposed in the room temperature for longer than 30 minutes, sensor data of the tag are not stored any more in the electronically erasable programmable ROM 103 since then in the method.

The present invention can sufficiently save memory space by collecting diverse state information of an object having a tag through a sensor and storing the state information in the memory based on a method specialized in an efficient sensor data format and a user application model.

Also, the present invention can minimize transmitting data through sensor data managing technique by optimizing a storing space.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application No. 2005-0121140, filed with the Korean Intellectual Property Office on Dec. 9, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for storing data of Radio Frequency Identification (RFID) tags having sensors, comprising:
    a controlling means for controlling the data from the sensors to be stored; and
    a storing means for storing the data from the sensors,
    wherein the storing means includes:
    a first storing unit which includes a kill password storage storing a kill password that an RFID reader transmits to an RFID tag in order to halt operation of the RFID tag, and an access password storage storing an access password of the tag;
    a second storing unit which includes an Electronic Product Code (EPC) storage storing a code for identifying an object having the tag, a protocol control storage having physical-layer information of the code storage, and an error check storage storing a Cyclic Redundancy Checking (CRC) code for detecting a transmission error;
    a third storing unit which includes a tag identifier storage storing a tag identifier including a manufacture model and a serial number of the tag; and
    a fourth storing unit which includes an initial sensor data storage storing initial information of the sensor, a real-time information storage storing information of year, month, day, time, minute and second, a maximum/minimum data storage storing maximum/minimum values compared to set up an excess/validity region of the sensing data, and a sensor data storage storing sensing data actually measured through the sensor embedded in the RFID tag.

2. The apparatus as recited in claim 1, wherein initial information of the sensor includes type information of the sensor embedded in the tag, type information of the tag including the sensor, and sensing time interval information of the tag including the sensor.

3. The apparatus as recited in claim 1, wherein in a process for storing data acquired from the sensor embedded in the tag in data storing apparatus for the RFID tags with sensors, sensing data inputted in real-time are compared/calculated with the maximum/minimum values of the maximum/minimum data storage, and the sensing values of the maximum/minimum excess regions are stored in the RFID tag data storing apparatus.

4. The apparatus as recited in claim 3, wherein when the sensing value of the maximum/minimum excess regions are stored, and only the corresponding value is stored by a command of a reader or a value pre-designated when the tag is manufactured.

5. The apparatus as recited in claim 1, wherein in a process for storing data acquired from the sensor embedded in the tag in the data storing apparatus for RFID tags with sensors, sensing data inputted in real-time are compared/calculated with the maximum/minimum values of the maximum/minimum data storage, and the sensing value of only a validity region is stored.

6. The apparatus as recited in claim 1, wherein in a process for storing data acquired from the sensor embedded in the tag in the data storing apparatus for RFID tags with sensors, only a difference between neighboring two data inputted in real-time is stored.

7. A method for storing data of Radio Frequency Identification (RFID) tags having sensors, comprising the steps of:
 a) controlling the data from the sensors to be stored on a storing means,
 wherein the storing means includes:
 a kill password storage storing a kill password that an RFID reader transmits to an RFID tag in order to halt operation of the RFID tag, and an access password storage storing an access password of the tag;
 an Electronic Product Code (EPC) storage storing a code for identifying an object having the tag, a protocol control storage having physical-layer information of the code storage, and storing a Cyclic Redundancy Checking (CRC) code for detecting a transmission error;
 a tag identifier storage storing a tag identifier having a manufacture model and a serial number of the tag; and
 an initial sensor data storage storing initial information of the sensor, storing information of year, month, day, time, minute and second, storing maximum/minimum values compared to set up an excess/validity region of the sensing data, and storing sensing data actually measured through the sensor embedded in the RFID tag.

8. The method as recited in claim 7, wherein initial information of the sensor includes type information of the sensor embedded in the tag, type information of the tag including the sensor, and sensing time interval information of the tag including the sensor.

9. The method as recited in claim 7, wherein in a process for storing data acquired from the sensor embedded in the tag in data storing apparatus for the RFID tags with sensors, sensing data inputted in real-time are compared/calculated with the maximum/minimum values of the maximum/minimum data storage, and the sensing values of the maximum/minimum excess regions are stored in the RFID tag data storing apparatus.

10. The method as recited in claim 9, wherein when the sensing value of the maximum/minimum excess regions are stored, and only the corresponding value is stored by a command of a reader or a value pre-designated when the tag is manufactured.

11. The method as recited in claim 7, wherein in a process for storing data acquired from the sensor embedded in the tag in the data storing apparatus for RFID tags with sensors, sensing data inputted in real-time are compared/calculated with the maximum/minimum values of the maximum/minimum data storage, and the sensing value of only a validity region is stored.

12. The method as recited in claim 7, wherein in a process for storing data acquired from the sensor embedded in the tag in the data storing apparatus for RFID tags with sensors, only a difference between neighboring two data inputted in real-time is stored.

* * * * *